Nov. 27, 1934.  A. J. BOCZ  1,982,151
CONTROLLING HEAT UNIT IN A THERMO ENGINE
Filed March 1, 1933  2 Sheets-Sheet 1
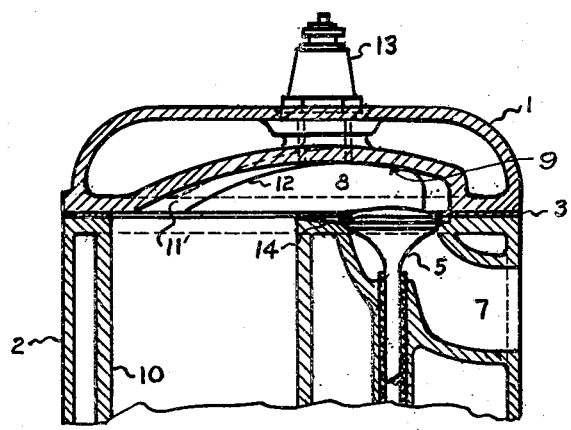
Fig. 1.
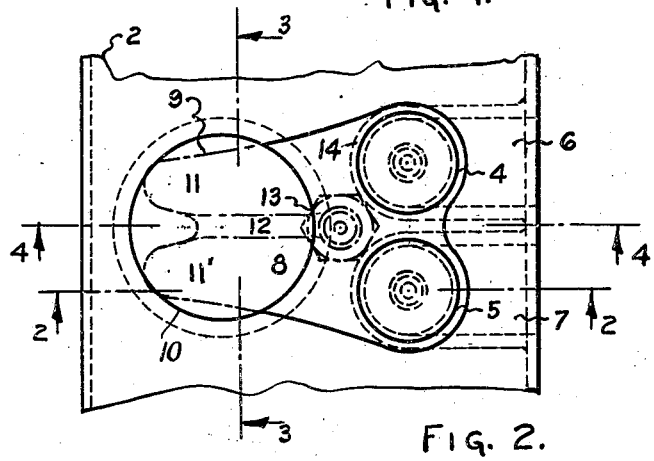
Fig. 2.
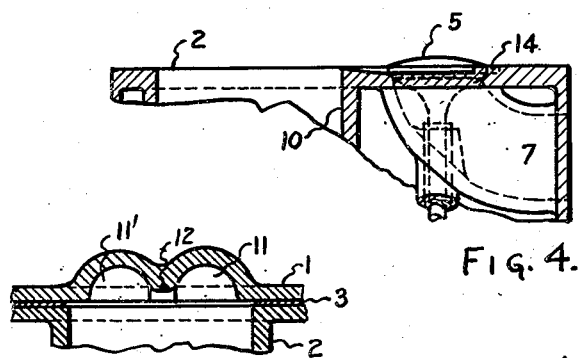
Fig. 4.
Fig. 3.
INVENTOR.
Alexander J. Bocz Patented Nov. 27, 1934

1,982,151

UNITED STATES PATENT OFFICE 1,982,151

CONTROLLING HEAT UNIT IN A THERMO ENGINE

Alexander J. Bocz, Detroit, Mich.

Application March 1, 1933, Serial No. 659,315

7 Claims. (Cl. 123—191)

REISSUED

My invention relates to a new means, and is a useful discovery for preventing or decreasing the detonation or preignition of any gases in an internal combustion or thermoengine, whereby, the compression pressure and the main effective pressure are greatly increased to attain a much higher horsepower of said engine for the minimum fuel used per brake horsepower, which is simple in structure, economical of manufacture and highly efficient in use.

The said method is for vaporizing the liquefied gases or fuel and water, which prevents the preignition or detonation of the gases in the cylinder of said engine, because the molecules of the gases are free to move without any restriction during any heat cycle therein, whereby said causes are prevented.

The said method and means, permit the use of a much cooler quantity fuel for an engine, which fuel would expand through the heat cycle process, whereby the volumetric efficiency of said cylinder is increased, therefore the main brake pressure is also enhanced, and a much greater brake horsepower is available for burning less fuel.

The various features and form are shown, in the combination and arrangement, in which said means are employed. Thereby the invention may be used without departing from the spirit and scope of the invention.

The invention will be best understood by reference to the accompanying drawings, which form a part of this specification and in which Fig. 1 is a front elevation and sectional view of one form of my invention shown and, it is applied to an L type thermoengine and illustrated in fragmentary section taken on line 2—2 of Fig. 2.

Fig. 2 is a plan view of the form shown in Fig. 1.

Fig. 3 is a fragmentary section view taken on line 3—3 of Fig. 2.

Fig. 4 is a fragmentary section view taken on line 4—4 of Fig. 2.

Figure 5:
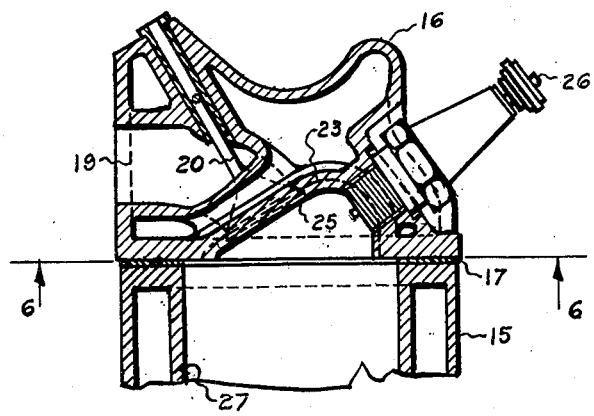
Figure 6:
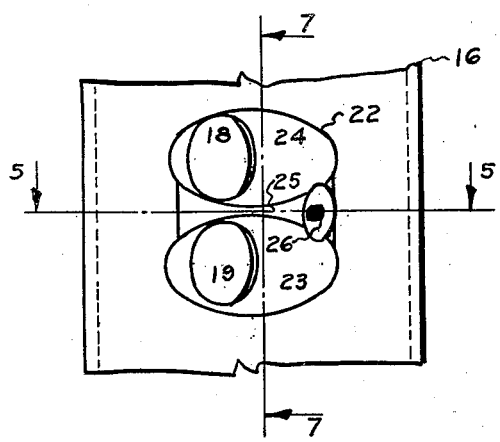
Figure 7:
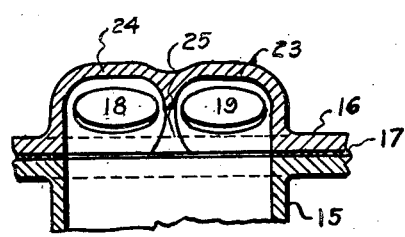

Figs. 1, 2, 3, and 4 are shown the invention, applied to an L type of thermoengine with the valves 4 and 5 intake and exhaust, which are positioned in the intake, exhaust passages 6, 7, which passages are cast into said block. The head 1 of said engine is separated by a gasket 3 from the cylinder block 2 and they are fastened together the head 1, gasket 3 and cylinder block 2 by some means, so that the chamber or dome 8 always stays in the assembled position as shown in Figs. 1 and 2 so that the curved shape 9 of said dome would cover, the intake and exhaust valves 4 and 5, and the cylinder bore 10, in which the piston is reciprocating.

The chamber or dome 8 is divided into sections 11, 11' by a depression 12 in the head; which forms an arch or flame regulator to separate the combustion chamber into two sections. These sections are somewhat spherical in form to give a maximum heating surface with a minimum radiation surface; to minimize heat loss.

The spark plug or ignition means 13 is positioned on the arch or flame regulator so that it projects into the center of gravity of the combustion chamber; whereby the flame has the shortest possible distance to travel and a sudden explosion of the fuel mixture is assured.

Therefore the pressure and temperature of said exploded gases are enhanced, whereby the roughness of the engine is decreased. The dilution of the lubricating oil is overcome or prevented and the carbon monoxide is diminished or it disappears from the exhaust gases.

The gutter or pocket 14 is cast on the cylinder block 2 or said block can be so machined as to obtain a similar gutter or pocket shown in Figs. 2 and 4, whose outside walls are heated by the exhaust gases. The intake valve 5 is opened, the piston moves in the cylinder bore 10 and fresh quality fuel is drawn through the port of said valve into said displacement, which fuel is always in contact with the gutter or pocket 14; therefore the fuel is heated and the moisture of said fuel will be dried or converted into a gas of the lighter series. The remainder of the fuel; the disassociated or unvaporized portions or liquefied gases on the top of the piston will be collected in said gutter or pocket, in which pocket they are heated to vaporize so a sudden flame propagation is available when ignited. The exploded gases expand on the top of the moving piston in the bore 10 of said cylinder, and the exhaust valve 4 is opened at a suitable position of said piston, thereby the burned gases are expelled from said cylinder into the atmosphere through a conveyer.

The temperature of the remainder of the burned gases is decreased through the radiation of said sections of the walls, for this reason the gases are contracted and increased in weight, therefore it will flow through the port of the exhaust valve 4 and have very little or no burned gases therein, then the exhaust valve 4 is closed and the intake valve 5 opens, and a new heat cycle starts with fresh cool quality fuel; and the same process follows as previously described.

The intake valve is opened before or after the piston passes the upper dead center the gases velocity would be increased a few thousand feet per second, which speed gradually decreases as soon as the piston attains its highest speed, the velocity of the gases drops, because the opening of the intake valve is increased and finally the said velocity would become zero. At this moment the moisture of the gases would appear in the cylinder as a liquid, which liquid is the cause of knocks, dilution of the lubricating oil, and monoxide carbon in the exhaust gases.

This invention is to prevent such trouble above described, almost all gases under compression. The temperature of said gases increases as well as the difference of the temperature would create a cycle between the walls of the combustion chamber and the top of the piston, which direction of the cycle would be forced to follow the shape of the spherical sections without any restriction so perfect dryness of the gases is insured and a uniform and much higher temperature of the gases is obtained, when explosion would take place.

The present invention or inventions as described are adaptable for any type of thermo-engine or any number of cylinder engine or Diesel motor or Banki-Csonka's engine, whereby water was used with the fuel to obtain a very high compression pressure without preignition, but the water could not disassociated into its atoms, when explosion occurred, because it was not heated to become steam;—whereas by applying my method to overcome this evil, the water can be heated in the gutter to become steam, which would mix with the gases and increase the temperature of said gases, and the heated steam would break up to its atoms now said atoms could burn at once with the exploded gases, therefore less fuel is used for a much greater brake horse power.

My belief is, that the present invention is new particularly in view of the fact, that the moisture of the gases can be turned into a dry state of gases, because the temperature of the compressed gases is increased, which creates a heat cycle in the spherical combustion chamber and the direction of the said cycle is forced to follow the sphere of the sections in said chamber, which are so curved or shaped by the ignition locater to insure a uniform high temperature for said fuel and a dry state of gas is available so the liquid would ignite with the exploded gases at once in the cylinder.

Broadly my invention or inventions comprises the use of the heat cycle, which is due to the compression of the gases or the heat of the exhaust gases, by converting the wet gases or water and fuel into a dry state to have a perfect flame propagation, which would be controlled through the ignition supporter.

I am aware several attempts were made to eliminate the knock, dilution of the lubricating oil and, to overcome the monoxide of the exhaust gases, they were a failure, because their efforts were to solve one trouble at one time, whereas I combine all these causes in one through the use of the spherical sections, which is the mixture chamber for the fuel to dry said fuel. Of course, the shape and size of the combustion chamber will vary with the various types and sizes of engine, anyone skilled in the art, knowing the size of the engine or the required main effective pressures of the said engine or engines with which this invention is used, can with a mathematical certainty compute the shape or contour of the combustion chamber to give the most desirable main effective pressure to the selected engine.

While I have illustrated and described my invention, I do not wish to limit myself to the precise details of structures shown, but desire to avail myself of such variations and modifications as come within the scope of the appended claims.

Having thus described my invention which I claim as new and desire to secure by Letters Patent is:

1. Means for vaporizing the liquefied gases in a cylinder of an internal combustion engine, comprising: a combustion chamber divided into two semipherical sections with an ignition locator, and a heated gutter means in said cylinder; and heated gutter means to convert the liquid fuel into gases.

2. Means for vaporizing the liquefied gases in the cylinder of an internal combustion engine, comprisng; two semispherical combustion chambers between them a flame regulator on which an ignitor placed, and a heated gutter means in said cylinder; heated gutter means to vaporize the liquid fuel into gases.

3. Means for vaporizing the liquefied gases in a cylinder of an internal combustion engine, comprising; a combustion chamber and a flame regulator means dividing said chamber into two semispherical sections, and an ignitor placed between them, and said cylinder having a heated gutter means to vaporize the liquid fuel; the flame regulator and gutter means to prevent liquid fuel and wet gases in said cylinder.

4. Means for a sudden explosion of the compressed mixture in a cylinder of an internal combustion engine, comprising: a combustion chamber and a flame regulator means dividing said chamber into two semispherical sections, in which an ignitor is placed to equalize the flame movement of the exploded mixture in said chamber, and said means causes a sudden explosion.

5. Means for a sudden explosion of the compressed gases in a cylinder of an internal combustion engine, comprising; a combustion chamber divided into two spherical sections between them a flame regulator means with an ignitor, and said means to centralize the flame of the exploded gases in said chamber.

6. Means for vaporizing the liquefied gases and drying the moisture of said gases to prevent the preignition in the cylinder of an internal combustion engine, comprising; an ignitor, a flame regulator means, a combustion chamber combined with two spherical sections, and said cylinder having a heated gutter means to vaporize the collected liquefied gases and water to steam, and said regulator means to said said moisture into a superheated state; gutter and flame regulator means co-operating with steam to prevent the preignition or detonation in the cylinder of said engine.

7. Means for vaporizing the liquefied gases and drying the moisture of said gases to prevent the preignition in the cylinder of an internal combustion engine, comprising; a combustion chamber having two semispherical sections, and between them a flame regulator means with an ignitor, and said cylinder with a heated gutter means; in which the liquid fuel to be collected to convert it into gas, and flame regulator means to stir said moisture into a dry mixture to obtain complete combustion in said cylinder.

ALEXANDER J. BOCZ.